United States Patent
Zhang et al.

(10) Patent No.: US 12,478,342 B2
(45) Date of Patent: Nov. 25, 2025

(54) REGION-OF-INTEREST EXTRACTION METHOD AND APPARATUS, AND DEVICE, SYSTEM AND STORAGE MEDIUM

(71) Applicant: SHANGHAI UNITED IMAGING HEALTHCARE CO., LTD., Shanghai (CN)

(72) Inventors: Na Zhang, Shanghai (CN); Juan Feng, Shanghai (CN); Le Yang, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 175 days.

(21) Appl. No.: 18/287,880

(22) PCT Filed: Apr. 28, 2022

(86) PCT No.: PCT/CN2022/089793
§ 371 (c)(1),
(2) Date: Oct. 22, 2023

(87) PCT Pub. No.: WO2022/228503
PCT Pub. Date: Nov. 3, 2022

(65) Prior Publication Data
US 2024/0366165 A1    Nov. 7, 2024

(30) Foreign Application Priority Data

Apr. 29, 2021 (CN) .......................... 202110475214.4

(51) Int. Cl.
*A61B 6/00* (2024.01)
*A61B 6/40* (2024.01)

(52) U.S. Cl.
CPC .......... *A61B 6/5205* (2013.01); *A61B 6/4007* (2013.01); *A61B 6/5241* (2013.01)

(58) Field of Classification Search
CPC .. A61B 6/00; A61B 6/02; A61B 6/027; A61B 6/03; A61B 6/04; A61B 6/0492;
(Continued)

(56) References Cited

U.S. PATENT DOCUMENTS

| 2011/0075792 A1 | 3/2011 | Akahori |
| 2016/0110875 A1 | 4/2016 | Sugiyama et al. |
| 2019/0209107 A1 | 7/2019 | Vogtmeier et al. |

FOREIGN PATENT DOCUMENTS

| CN | 109991247 A | 7/2019 |
| CN | 111956248 A | 11/2020 |
(Continued)

OTHER PUBLICATIONS

European Search Report (EP Application No. 22794973.2), dated Sep. 16, 2024, 29 pages.
International Search Report of PCT/CN2022/089793.

*Primary Examiner* — Don K Wong

(57) ABSTRACT

A region-of-interest extraction method and an apparatus, and a device, a system and a storage medium are provided. The region-of-interest extraction method is applied to an X-ray imaging system. The X-ray imaging system includes a detector and an array X-ray source, the array X-ray source includes a plurality of X-ray sources having different projection angles, and imaging regions corresponding to the plurality of X-ray sources are formed on the detector. The method includes: acquiring geometric position parameters corresponding to the plurality of X-ray sources; grouping the plurality of X-ray sources according to the geometric position parameters of the plurality of X-ray sources, determining at least one X-ray source group, and imaging regions of X-ray sources in the same X-ray source group not overlapping with each other; combining the imaging regions of the X-ray sources in each of the at least one X-ray source group, so as to determine a combined imaging region correspond- (Continued)

ing to each of the at least one X-ray source group; and performing region-of-interest extraction on projection data in the combined imaging region corresponding to each of the at least one X-ray source group.

18 Claims, 7 Drawing Sheets

(58) Field of Classification Search
CPC ... A61B 6/4007; A61B 6/4014; A61B 6/4021; A61B 6/4028; A61B 6/405; A61B 6/4064; A61B 6/4266; A61B 6/486; A61B 6/488; A61B 6/545; A61B 6/547; G06T 3/00; G06T 3/14; G06T 7/60
See application file for complete search history.

(56) References Cited

FOREIGN PATENT DOCUMENTS

| | | | |
|---|---|---|---|
| CN | 111991015 A | 11/2020 | |
| CN | 113274041 A | 8/2021 | |
| WO | WO-2021108715 A1 * | 6/2021 | ............... A61B 6/54 |

* cited by examiner

REGION-OF-INTEREST EXTRACTION METHOD AND APPARATUS, AND DEVICE, SYSTEM AND STORAGE MEDIUM

CROSS-REFERENCE TO RELATED APPLICATIONS

This application is an U.S. national phase application under 35 U.S.C. § 371 based upon international patent application No. PCT/CN2022/089793, filed on Apr. 28, 2022, which itself claims priority to Chinese patent application No. 202110475214.4, filed on Apr. 29, 2021, titled "REGION-OF-INTEREST EXTRACTION METHOD AND APPARATUS, AND DEVICE, SYSTEM AND STORAGE MEDIUM". The content of the above application is hereby incorporated by reference.

TECHNICAL FIELD

The present disclosure generally relates to the field of data processing, and in particular, to a region-of-interest extraction method and an apparatus, and a device, a system and a storage medium.

BACKGROUND

When examining a mammary gland of human, a mammography machine is used mostly for examination. An emission source of a current mammography machine is mostly an X-ray source consisting of a single fluorescent tube with a hot cathode, resulting in a need to rotate the X-ray source to scan the mammary gland in multiple views when multi-view imaging of the mammary gland is required. Such a scanning manner is prone to form artifacts during motion scanning, which affects quality of a reconstructed image. Therefore, in order to minimize motion artifacts, a mammography machine adopting a fluorescent tube with a cold cathode as the X-ray source, also known as a mammography machine adopting a field-emission X-ray source, is slowly appearing.

In the related art, when the mammography machine adopts the field-emitting X-ray source as the emission source, a plurality of field-emitting X-ray sources are usually adopted together as the emission source, and X-ray sources performs projection imaging of different portions of the mammary gland, respectively. Then an image of a mammary gland region in each projection imaging is extracted, and ultimately images of all the mammary gland regions are performed image reconstruction to obtain an image of the mammary gland.

However, the above technique has a time-consuming problem in extracting the mammary gland regions in each projection imaging.

SUMMARY

For the issue of the above technical problem, a region-of-interest extraction method and an apparatus, and a computer device, an X-ray imaging system, and a storage medium that can save extraction time of a region-of-interest are provided.

A region-of-interest extraction method is applied to an X-ray imaging system, the X-ray imaging system includes a detector and an array X-ray source, the array X-ray source includes a plurality of X-ray sources having different projection angles, and imaging regions corresponding to the plurality of X-ray sources are formed on the detector. The region-of-interest extraction method includes:
  acquiring geometric position parameters corresponding to the plurality of X-ray sources; grouping the plurality of X-ray sources according to the geometric position parameters of the plurality of X-ray sources, determining at least one X-ray source group, and imaging regions of X-ray sources in the same X-ray source group not overlapping with each other;
  combining the imaging regions of the X-ray sources in each of the at least one X-ray source group, so as to determine a combined imaging region corresponding to each of the at least one X-ray source group; and
  performing region-of-interest extraction on projection data in the combined imaging region corresponding to each of the at least one X-ray source group.

In an embodiment, the grouping the plurality of X-ray sources according to the geometric position parameters of the plurality of X-ray sources, and determining at least one X-ray source group further includes:
  calculating ranges of the imaging regions corresponding to the plurality of X-ray sources according to the geometric position parameters corresponding to the plurality of X-ray sources;
  determining a respective corresponding target X-ray source of the plurality of X-ray sources according to the ranges of the imaging regions corresponding to the plurality of X-ray sources, and the target X-ray source of the current X-ray source being an X-ray source whose imaging region does not overlap with the imaging region of the current X-ray source; and
  combining each of the plurality of X-ray sources and the respective corresponding target X-ray source to obtain the at least one X-ray source group.

In an embodiment, the determining the respective corresponding target X-ray source of the plurality of X-ray sources according to the ranges of the imaging regions corresponding to the plurality of X-ray sources further includes:
  acquiring a distance between any adjacent two of the plurality of X-ray sources;
  calculating the number of X-ray sources involved within the range of the imaging region corresponding to each of the plurality of X-ray sources according to the distance between any adjacent two of the plurality of X-ray sources and the range of the imaging region corresponding to each of the plurality of X-ray sources; and
  obtaining the respective corresponding target X-ray source of the plurality of X-ray sources according to the number of X-ray sources involved within the range of the imaging region corresponding to each of the plurality of X-ray sources.

In an embodiment, the obtaining the respective corresponding target X-ray source of the plurality of X-ray sources according to the number of X-ray sources involved within the range of the imaging region corresponding to each of the plurality of X-ray sources further includes:
  when the number of X-ray sources involved within the range of the imaging region corresponding to a first X-ray source is defined as n, an (n+1)-th X-ray source being regarded as the target X-ray source corresponding to the first X-ray source, and the current X-ray source being defined as the first X-ray source; and
  traversing the other X-ray sources according to the number of X-ray sources involved within the range of the imaging region corresponding to each of the other X-ray sources to obtain the respective corresponding target X-ray source of the other X-ray sources.

In an embodiment, the obtaining the respective corresponding target X-ray source of the plurality of X-ray sources according to the number of X-ray sources involved within the range of the imaging region corresponding to each of the plurality of X-ray sources further includes:

when the number of X-ray sources involved within the range of the imaging region corresponding to a first X-ray source is defined as n, X-ray sources after an n-th X-ray source being regarded as the target X-ray source corresponding to the first X-ray source, and the current X-ray source being defined as the first X-ray source; and traversing the other X-ray sources according to the number of X-ray sources involved within the range of the imaging region corresponding to each of the other X-ray sources to obtain the respective corresponding target X-ray source of the other X-ray sources.

In an embodiment, the combining the imaging regions of the X-ray sources in each of the at least one X-ray source group, so as to determine the combined imaging region corresponding to each of the at least one X-ray source group further includes:

combining the imaging regions of the X-ray sources either or both of horizontally and vertically in accordance with positions of the imaging regions of the X-ray sources in each of the at least one X-ray source group, and obtaining the combined imaging region corresponding to each of the at least one X-ray source group.

In an embodiment, the geometric position parameters include relative positional relationship parameters between adjacent X-ray sources, relative positional relationship parameters between the plurality of X-ray sources and the detector, and angle parameters of the plurality of X-ray sources.

In an embodiment, the relative positional relationship parameters between adjacent X-ray sources further includes first distances between adjacent X-ray sources, the relative positional relationship parameters between the plurality of X-ray sources and the detector further includes second distances between the plurality of X-ray sources and the detector, and the angle parameters of the plurality of X-ray sources further includes divergence angles corresponding to the plurality of X-ray sources.

In an embodiment, all the first distances between adjacent X-ray sources are equal, all the second distances between the plurality of X-ray sources and the detector are equal, and all the divergence angles corresponding to the plurality of X-ray sources are equal.

In an embodiment, the calculating the ranges of the imaging regions corresponding to the plurality of X-ray sources according to geometric position parameters corresponding to the plurality of X-ray sources further includes:

$$R = 2 \times SID \times \tan(p/2),$$

R represents the range of the imaging region of each X-ray source, SID represents the second distance of corresponding X-ray source, and p represents the divergence angle of corresponding X-ray source.

In an embodiment, the calculating the number of X-ray sources involved within the range of the imaging region corresponding to each of the plurality of X-ray sources according to the distance between any adjacent two of the plurality of X-ray sources and the range of the imaging region corresponding to each of the plurality of X-ray sources further includes:

$$n = \Pi(R/d),$$

n represents the number of X-ray sources involved within the range of the imaging region corresponding to each of the plurality of X-ray sources, d represents the first distance of corresponding X-ray source, and $\Pi(R/d)$ represents a contrast value R/d rounded upward.

A region-of-interest extraction apparatus is applied to an X-ray imaging system. The X-ray imaging system includes a detector and an array X-ray source, the array X-ray source includes a plurality of X-ray sources having different projection angles, and imaging regions corresponding to the plurality of X-ray sources are formed on the detector.

The region-of-interest extraction apparatus includes an acquiring module, a grouping module, a combining module, and an extraction module.

The acquiring module is configured for acquiring geometric position parameters corresponding to the plurality of X-ray sources.

The grouping module is configured for grouping the plurality of X-ray sources according to the geometric position parameters of the plurality of X-ray sources, and determining at least one X-ray source group. Imaging regions of X-ray sources in the same X-ray source group do not overlap with each other.

The combining module is configured for combining the imaging regions of the X-ray sources in each of the at least one X-ray source group, so as to determine a combined imaging region corresponding to each of the at least one X-ray source group.

The extraction module is configured for performing region-of-interest extraction on projection data in the combined imaging region corresponding to each of the at least one X-ray source group.

A computer device is provided. The computer device includes a processor and a memory, the memory stores a computer program, the computer program is executable by the processor to implement the following steps:

acquiring geometric position parameters corresponding to the plurality of X-ray sources;

grouping the plurality of X-ray sources according to the geometric position parameters of the plurality of X-ray sources, determining at least one X-ray source group, and imaging regions of X-ray sources in the same X-ray source group not overlapping with each other;

combining the imaging regions of the X-ray sources in each of the at least one X-ray source group, so as to determine a combined imaging region corresponding to each of the at least one X-ray source group; and performing region-of-interest extraction on projection data in the combined imaging region corresponding to each of the at least one X-ray source group.

An X-ray imaging system, comprising a detector, an array X-ray source, and the computer device.

A computer-readable storage medium having stored a computer program is provided. The computer program is executable by a processor to implement the following steps:

acquiring geometric position parameters corresponding to the plurality of X-ray sources;

grouping the plurality of X-ray sources according to the geometric position parameters of the plurality of X-ray sources, determining at least one X-ray source group, and imaging regions of X-ray sources in the same X-ray source group not overlapping with each other;

combining the imaging regions of the X-ray sources in each of the at least one X-ray source group, so as to determine a combined imaging region corresponding to each of the at least one X-ray source group; and performing region-of-interest extraction on projection data in the combined imaging region corresponding to each of the at least one X-ray source group.

The above region-of-interest extraction method and apparatus, and the device, the system and the storage medium are applied to the X-ray imaging system, the X-ray imaging system includes the detector and the array X-ray source, the array X-ray source includes the plurality of X-ray sources having different projection angles, and the imaging regions corresponding to the plurality of X-ray sources are formed on the detector. The geometric position parameters corresponding to the plurality of X-ray sources may be acquired, the plurality of X-ray sources may be grouped according to the geometric position parameters of the plurality of X-ray sources, at least one X-ray source group may be determined, the imaging regions of the X-ray sources in each of the at least one X-ray source group may be combined to determine the combined imaging region corresponding to each of the at least one X-ray source group, and the region-of-interest extraction may be performed on projection data in the combined imaging region corresponding to each of the at least one X-ray source group. The imaging regions of X-ray sources in the same X-ray source group do not overlap with each other. In the method, the plurality of X-ray sources may be grouped and the imaging regions of X-ray sources within the group may be combined, so that it is not necessary to sequentially extract individual imaging region when extract the region of interest, but only the region of interest of a small number of the combined imaging regions need to be extracted, i.e., the number of imaging regions from which the region of interest is to be extracted is relatively less, and a corresponding extraction time is shortened. Thus, a time for extracting the region of interest may be saved.

DETAILED DESCRIPTION OF THE EMBODIMENT

In order to make purposes, technical solutions and advantages of the present disclosure more clearly understood, the present disclosure is described in further detail below in conjunction with the accompanying drawings and embodiments. It should be understood that the specific embodiments described herein are for the sole purpose of explaining the present disclosure and are not intended to limit the present disclosure.

A region-of-interest extraction method provided in the present disclosure is applied to an X-ray imaging system, and the X-ray imaging system includes a detector, an array X-ray source, and a computer device. The array X-ray source is configured to emit X-rays to a detection object, the detection object may be disposed between the array X-ray source and the detector, and after the array X-ray source emits X-rays to the detection object, the detector may receive X-ray source data through a human body. Meanwhile, the detector may transmit the received X-ray source data to the computer device, so that the computer device may perform data processing as well as image reconstruction, region of interest extraction and other processes on the transmitted data.

Furthermore, the array X-ray source includes a plurality of X-ray sources having different projection angles, and imaging regions corresponding to the plurality of X-ray sources are formed on the detector.

It should be noted that an executing subject of an embodiment in the present disclosure may be an X-ray imaging system, a computer device, or a region-of-interest extraction apparatus, and the following describes the computer device as the executing subject.

Figure 1:
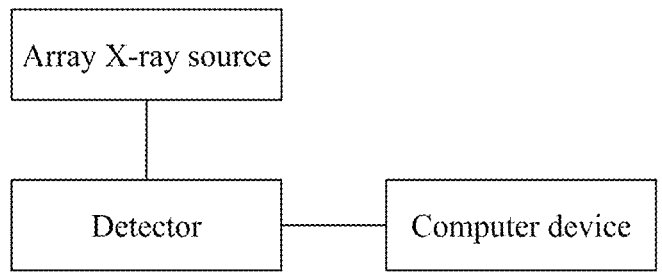
FIG. 1 is a block diagram of a structure of an X-ray imaging system in an embodiment.
Figure 2:
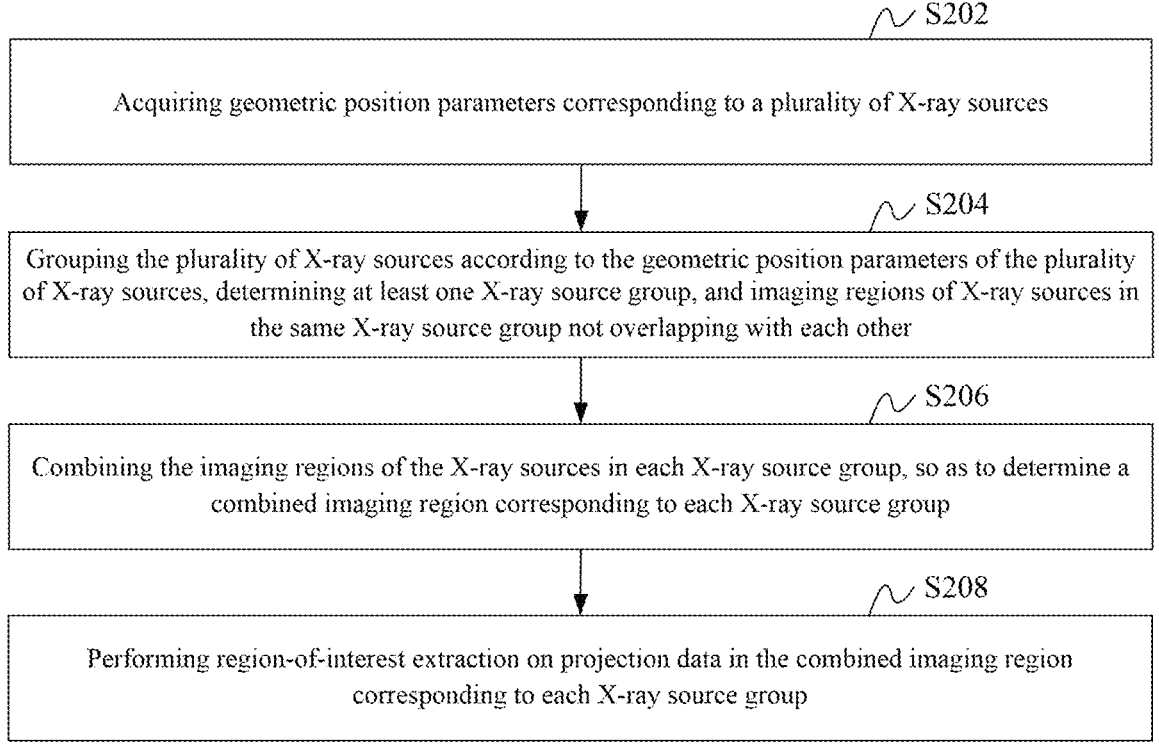
FIG. 2 is a flowchart diagram of a region-of-interest extraction method in an embodiment.

In an embodiment, a region-of-interest extraction method is provided, and the method is applied to an X-ray imaging system. The X-ray imaging system includes a detector and an array X-ray source. The array X-ray source includes a plurality of X-ray sources having different projection angles, and imaging regions corresponding to the plurality of X-ray sources are formed on the detector. The present embodiment relates to a specific process of how to group X-ray sources and combine imaging regions to extract regions of interest. Referring to FIG. 2, the method includes step 202 to step 208.

Step 202 includes acquiring geometric position parameters corresponding to a plurality of X-ray sources.

The geometric position parameters corresponding to the plurality of X-ray sources may include relative positional relationship parameters between adjacent X-ray sources, relative positional relationship parameters between the plurality of X-ray sources and the detection object, relative positional relationship parameters between the plurality of X-ray sources and the detector, angle parameters of the plurality of X-ray sources itself, and the like.

Specifically, when the array X-ray sources are set up, the geometric position parameters of each X-ray source in the array may be set in advance, so that when the geometric position parameters of each X-ray source are needed, the corresponding geometric position parameters can be obtained directly.

Step 204 includes grouping the plurality of X-ray sources according to the geometric position parameters of the plurality of X-ray sources, determining at least one X-ray source group, and imaging regions of X-ray sources in the same X-ray source group not overlapping with each other.

In the present step, after the geometric position parameters of the plurality of X-ray sources are acquired, the X-ray sources whose imaging regions do not overlap with each other may be divided into a group in accordance with the geometric position parameters of the plurality of X-ray sources to obtain the at least one X-ray source group.

The divided X-ray source groups may include one X-ray source group, and in this case, the one X-ray source group may include a plurality of X-ray sources. The divided X-ray source groups may include a plurality of X-ray source groups, and in this case, each of the plurality of the X-ray source groups may include a plurality of X-ray sources, or some X-ray source groups may include a plurality of X-ray sources, some X-ray source groups may include one X-ray source. The present embodiment is not specifically limited in this regard.

Step 206 includes combining the imaging regions of the X-ray sources in each X-ray source group, so as to determine a combined imaging region corresponding to each X-ray source group.

In the present step, after the plurality of X-ray sources are divided into the X-ray source groups, the imaging regions of the X-ray sources in each X-ray source group may be combined to obtain an imaging region corresponding to each X-ray source group as the combined imaging region corresponding to each X-ray source group.

When the imaging regions of the X-ray sources in each X-ray source group are combined, the imaging regions may be combined according to relative positional relationship among the imaging regions of the X-ray sources. For example, in an order from front to back, from top to bottom, or from left to right, and so on. The combination may include operations such as splicing or merging.

The splicing usually refers to joining the imaging regions together, i.e., seamlessly joining the imaging regions together in sequence in accordance with position information of the imaging regions. The merging refers to combing the imaging regions together in accordance with the position information of the imaging regions, and a gap may exist between every adjacent two imaging regions within the combined imaging region.

Step 208 includes performing region-of-interest extraction on projection data in the combined imaging region corresponding to each X-ray source group.

The region of interest may be any body part of the detection object. For example, the region of interest may be a chest, a head, or a leg of the detection object, etc. The region of interest may also be a focal region of any body part of the detection object. For example, the region of interest may be the focal region of the chest, the focal region of the head, or the focal region of the leg of the detection object, etc.

When the region of interest of the detection object is imaged by the X-ray sources in the array X-ray source, the X-ray sources may be adopted to emit X-rays sequentially to the region of interest of the detection object, the imaging regions corresponding to the X-ray sources may be formed on the detector, and projection data of the region of interest after transmission of the X-ray sources to the region of interest may be included within each of the imaging regions.

Specifically, after the combined imaging region corresponding to each X-ray source group is obtained, a segmentation algorithm, an extraction algorithm, and the like may be adopted to extract the projection data of the region of interest within each combined imaging region to obtain the projection data of the region of interest within each combined imaging region. Afterward, the obtained projection data may be processed by image reconstruction or the like to obtain an image of the region of interest.

The above region-of-interest extraction method is applied to the X-ray imaging system, the X-ray imaging system includes the detector and the array X-ray source, the array X-ray source includes the plurality of X-ray sources having different projection angles, and the imaging regions corresponding to the plurality of X-ray sources are formed on the detector. The geometric position parameters corresponding to the plurality of X-ray sources may be acquired, the plurality of X-ray sources may be grouped according to the geometric position parameters of the plurality of X-ray sources, at least one X-ray source group may be determined, the imaging regions of the X-ray sources in each of the at least one X-ray source group may be combined to determine the combined imaging region corresponding to each of the at least one X-ray source group, and the region-of-interest extraction may be performed on projection data in the combined imaging region corresponding to each of the at least one X-ray source group. The imaging regions of X-ray sources in the same X-ray source group do not overlap with each other. In the method, the plurality of X-ray sources may be grouped and the imaging regions of X-ray sources within the group may be combined, so that it is not necessary to sequentially extract individual imaging region when extract the region of interest, but only the region of interest of a small number of the combined imaging regions need to be extracted. The number of imaging regions from which the region of interest is to be extracted is relatively less, and a corresponding extraction time is shortened. Thus, a time for extracting the region of interest may be saved.

The above method illustrates that the plurality of X-ray sources may be grouped according to the geometric position parameters of the plurality of X-ray sources, and a specific grouping process is as follows.

In another embodiment, another region-of-interest extraction method is provided. The present embodiment relates to a specific process of how to group the plurality of X-ray sources according to the geometric position parameters of the plurality of X-ray sources. Based on the above embodiments, referring to FIG. 3, step 204 may include step 302 to step 306.

Step 302 may include calculating ranges of the imaging regions corresponding to the plurality of X-ray sources according to the geometric position parameters corresponding to the plurality of X-ray sources.

In the present step, alternatively, the geometric position parameters corresponding to the plurality of X-ray sources may include first distances between adjacent X-ray sources, divergence angles corresponding to the plurality of X-ray sources, and second distances between the plurality of X-ray sources and the detector. The divergence angles corresponding to the plurality of X-ray sources may also be called as cone angles corresponding to the plurality of X-ray sources.

Figure 3:
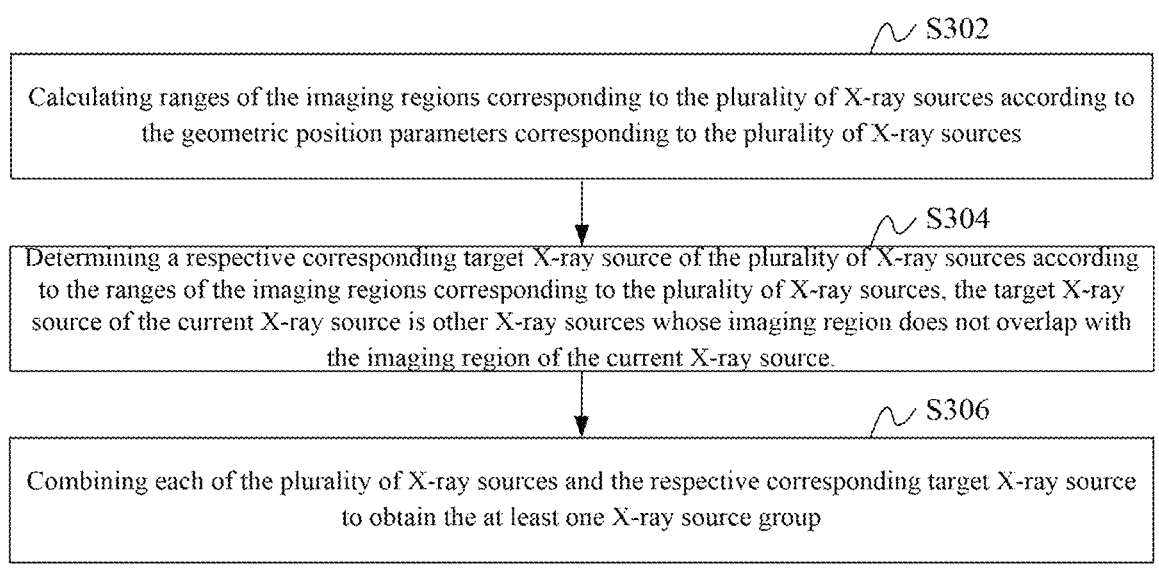
FIG. 3 is a flowchart diagram of a region-of-interest extraction method in another embodiment.
Figure 3A:
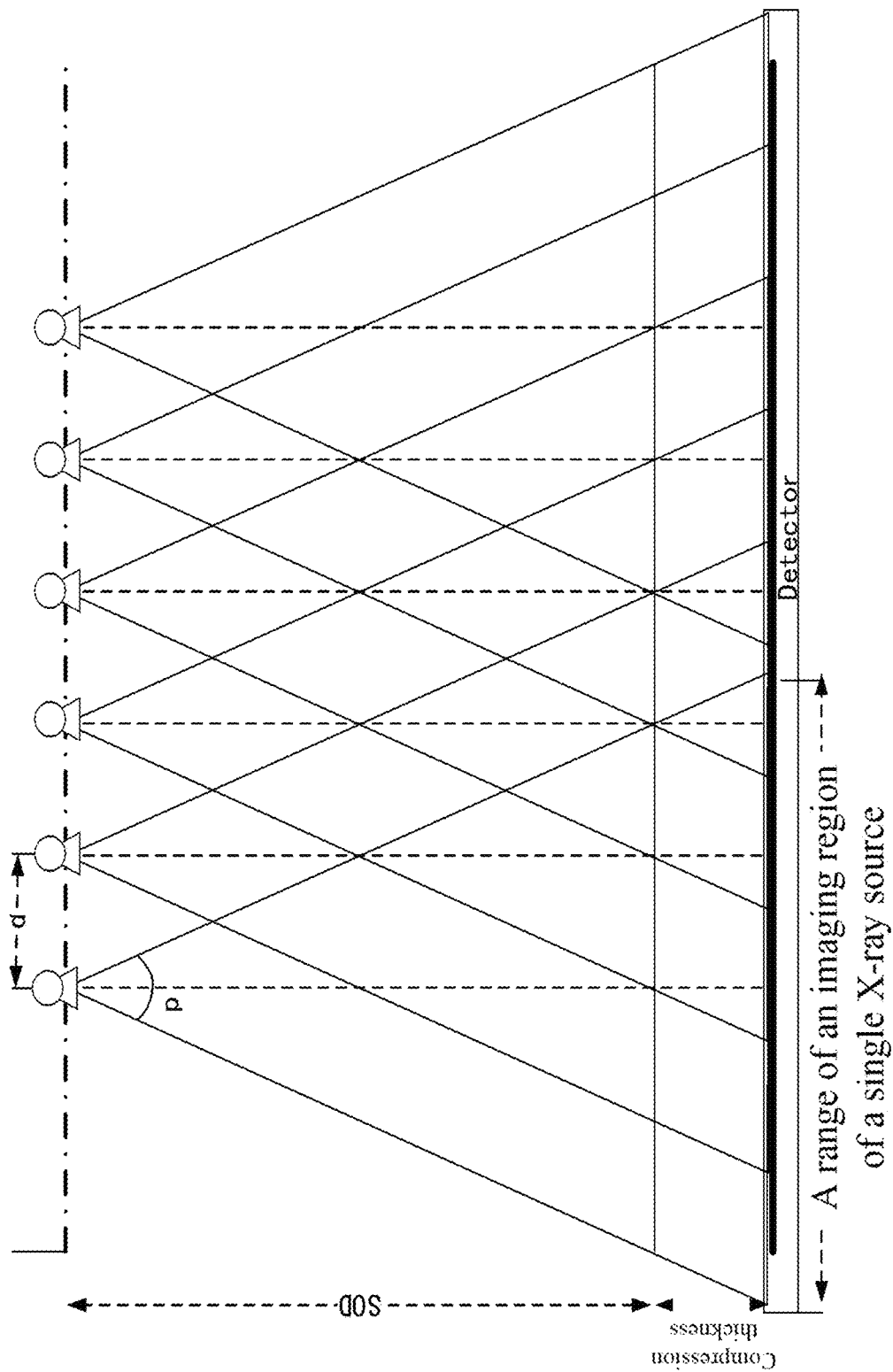
FIG. 3A is a schematic diagram of calculating a range of an imaging region corresponding to an X-ray source in another embodiment.

Referring to FIG. 3A, distances between adjacent X-ray sources are equal, denoted as the first distances. Distances between the plurality of X-ray sources and the detector are equal, denoted as the second distances. It is assumed that a breast part of the detection object is detected, a second distance between each of the plurality of X-ray sources and the detector is equal to a sum of a distance between each of the plurality of X-ray source and a compression plate and a compression thickness of the breast part. In addition, the divergence angles corresponding to the plurality of X-ray sources are equal.

d represents a first distance, SOD represents the distance between each of the plurality of X-ray source and the compression plate, SID represents the distance between each of the plurality of X-ray source and the detector, Detector represents the detector, and in a case of a first X-ray source, p represents a corresponding divergence angle.

Specifically, after the first distance d between adjacent X-ray sources, the distances SID between the plurality of X-ray sources and the detector, i.e., the second distances, and the divergence angles p corresponding to the plurality of X-ray sources are obtained, the ranges of the imaging regions corresponding to the plurality of X-ray sources may be calculated according to a geometric position relationship, and a calculation formula is as follows.

$$R = 2 \times SID \times \tan(p/2) \quad (1)$$

R represents the ranges of the imaging regions corresponding to the plurality of X-ray sources.

According to the above description, when the divergence angles, the first distances and the second distances corresponding to the plurality of X-ray sources are equal, respectively, the ranges of the imaging regions corresponding to the plurality of X-ray sources are also equal.

Furthermore, since positions of the plurality of X-ray sources are fixed, position information of the plurality of X-ray sources may be known in advance, and position information of the detector may be known in advance at the same time. After the ranges of imaging regions corresponding to the plurality of X-ray sources are obtained, position information of the imaging regions corresponding to the plurality of X-ray sources on the detector may also be calculated.

Step 304 may include determining a respective corresponding target X-ray source of the plurality of X-ray sources according to the ranges of the imaging regions corresponding to the plurality of X-ray sources, the target X-ray source of the current X-ray source is other X-ray sources whose imaging region does not overlap with the imaging region of the current X-ray source.

In the present step, after the ranges of the imaging regions corresponding to the plurality of X-ray sources are obtained, the imaging region of other X-ray source that do not overlap with the imaging region of the current X-ray source may be obtained by comparing the position information of imaging regions corresponding to the plurality of X-ray sources, i.e., the target X-ray source of the current X-ray source may be obtained. Each of the plurality of X-ray sources may be traversed to obtain the target X-ray source corresponding to each the plurality of X-ray sources.

The X-ray source corresponding to other imaging region that overlaps with the imaging region of the current X-ray source may be calculated by the ranges of imaging regions corresponding to the plurality of X-ray sources, and the target X-ray source of the current X-ray source may be obtained by removing the X-ray source corresponding to other imaging region that overlaps with the imaging region of the current X-ray source. Each of the plurality of X-ray sources may be traversed to obtain the target X-ray source corresponding to each the plurality of X-ray sources.

Other means of obtaining the target X-ray source may also be applied, which are not specifically qualified in the present embodiment.

Step 306 may include combining each of the plurality of X-ray sources and the respective corresponding target X-ray source to obtain the at least one X-ray source group.

In the present step, after the target X-ray source corresponding to the each of the plurality of X-ray sources is obtained, each of the plurality of X-ray sources and the respective corresponding target X-ray source may be combined to a group to obtain the at least one X-ray source group.

In the region-of-interest extraction method of the present embodiment, the ranges of corresponding imaging regions may be calculated according to the geometric position parameters corresponding to the plurality of X-ray sources, the respective corresponding target X-ray source of the plurality of X-ray sources may be determined according to the ranges of the imaging regions corresponding to the plurality of X-ray sources, and each of the plurality of X-ray sources and the respective corresponding target X-ray source may be combined to obtain the at least one X-ray source group. The target X-ray source of the current X-ray source is other X-ray sources whose imaging region does not overlap with the imaging region of the current X-ray source. In the present embodiment, the ranges of imaging regions may be calculated according to the geometric position parameters, the target X-ray source whose imaging region does not overlap may be determined by the ranges of imaging regions corresponding to the plurality of X-ray sources, and then the grouping may be performed. The calculation process is relatively simple, which may speed up the grouping of the plurality of X-ray sources and further improve extraction efficiency of the overall region of interest.

The above briefly describes a process of determining the target X-ray source of each of the plurality of X-ray sources, and a specific implementation of calculating the target X-ray source is as follows.

In another embodiment, another region-of-interest extraction method is provided. The present embodiment relates to a specific process of how to determine respective target X-ray source by the ranges of the imaging regions of the plurality of X-ray sources. Based on the above embodiments, referring to FIG. 4, step 304 may include step 402 to step 406.

Step 402 may include acquiring a distance between any adjacent two of the plurality of X-ray sources.

The distance between any adjacent two of the plurality of X-ray sources is the first distance d, the first distance d may be known when the geometric position parameters of the plurality of X-ray sources are preset.

Step 404 may include calculating the number of X-ray sources involved within the range of the imaging region corresponding to each of the plurality of X-ray sources according to the distance between any adjacent two of the plurality of X-ray sources and the range of the imaging region corresponding to each of the plurality of X-ray sources.

In the present step, in order to simplify subsequent grouping, the number of X-ray sources involved within the range of the imaging region corresponding to each of the plurality of X-ray sources may be calculated along a preset direction. Specifically, the number of X-ray sources involved within the range of the imaging region corresponding to the current X-ray source may be calculated by the following formula (2). Each of the plurality of X-ray sources may be traversed to obtain the number of X-ray sources involved within the range of the imaging region corresponding to each of the plurality of X-ray sources. In the formula (2), n represents the number of X-ray sources involved within the range of the imaging region corresponding to the current X-ray source, and the formula (2) is as follows.

$$n = \Pi(R/d) \qquad (2)$$

In the formula (2), the n is greater than or equal to 1, Π(R/d) is a contrast value R/d rounded upward. The current X-ray source may be defined as the first X-ray source, and according to the formula (2), the imaging region of the current X-ray source, that is, the first X-ray source, does not overlap with that of the (n+1)-th X-ray source on the detector. Referring to FIG. 4A, the preset direction may be a direction from left to right, the imaging region of the first X-ray source does not overlap with that of the sixth X-ray source in the FIG. 4A. It can be seen that the number of X-ray sources involved within the range of the imaging region of the first X-ray source in FIG. 4A is 5.

Figure 4:
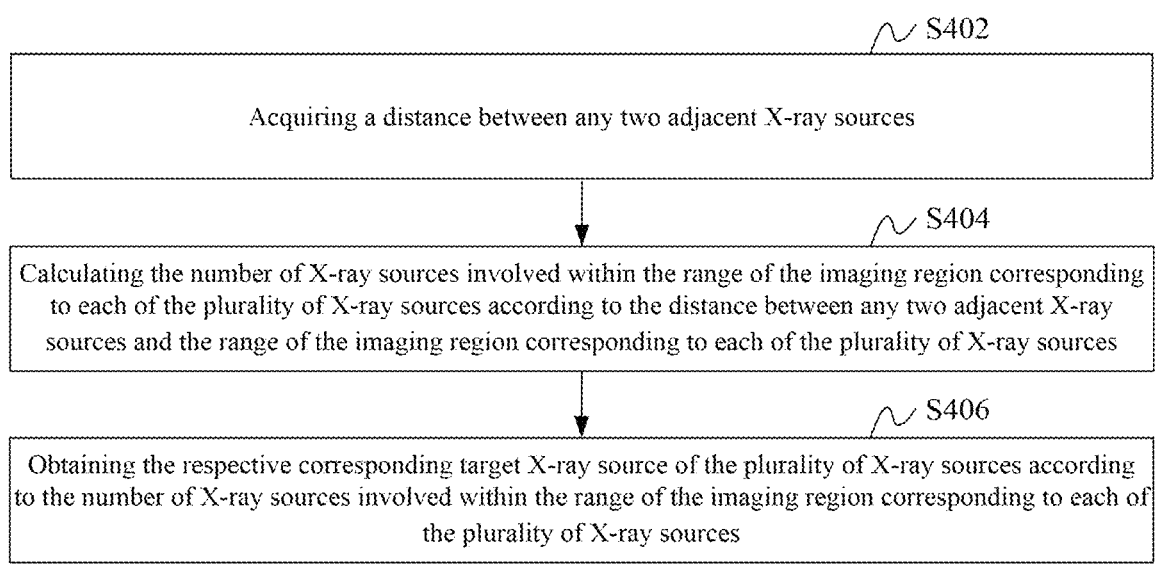
FIG. 4 is a flowchart diagram of a region-of-interest extraction method in another embodiment.
Figure 4A:
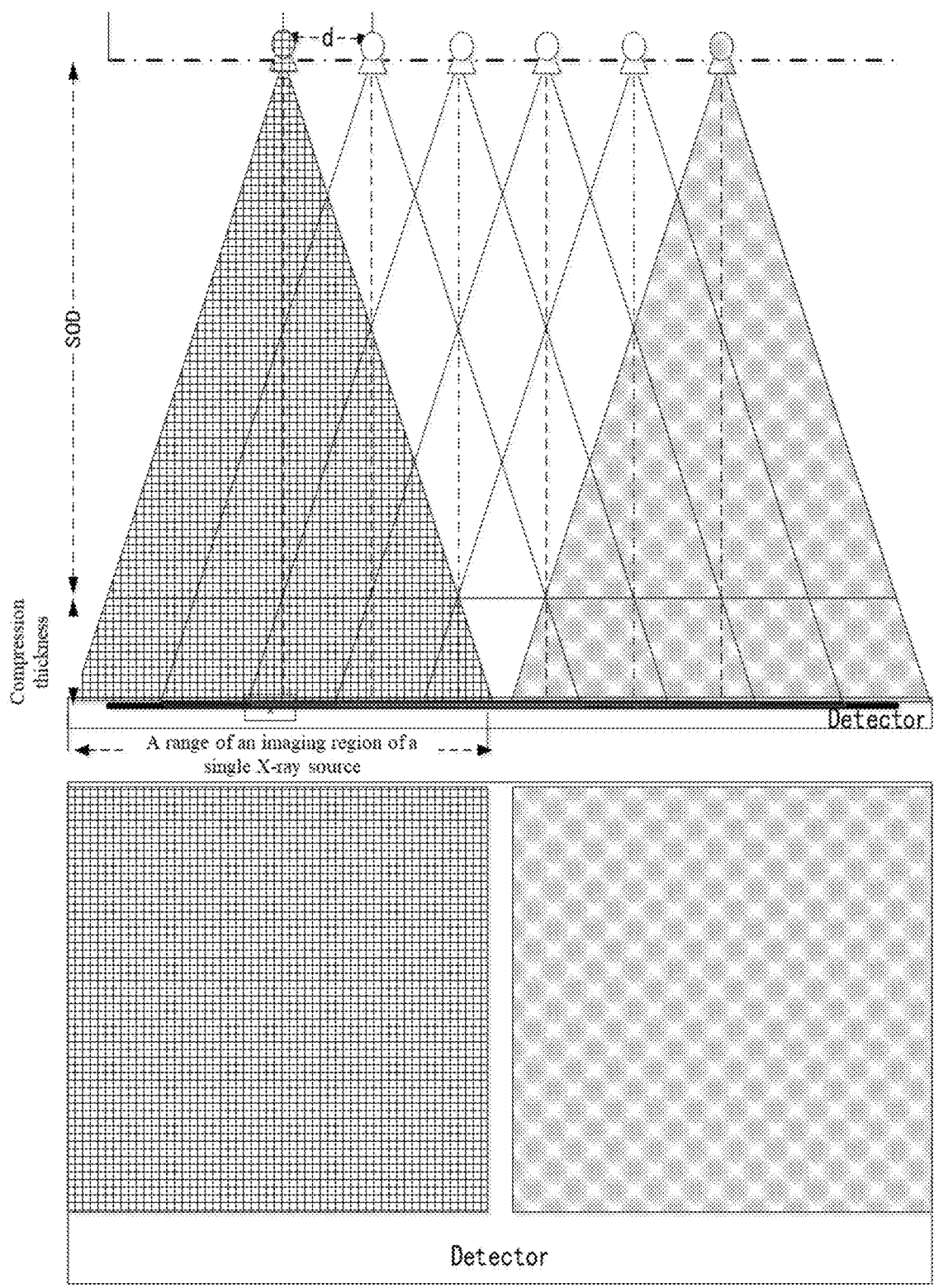
FIG. 4A is a schematic diagram of calculating the number of X-ray sources involved in an X-ray source in another embodiment.
Figure 4B:
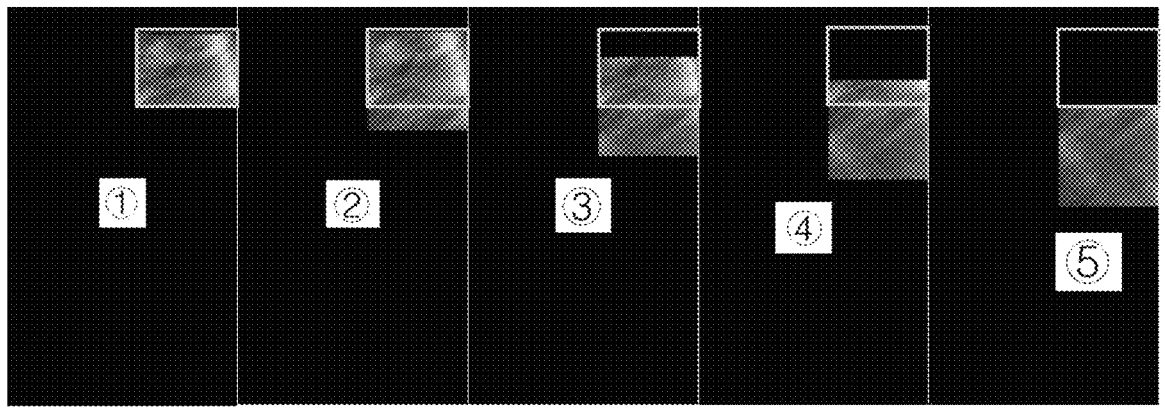
FIG. 4B is a schematic diagram of an effect corresponding to an acquired image when extracting a region of interest in another embodiment.

In addition, when the region of interest is extracted, referring to a corresponding effect of an acquired image as shown in FIG. 4B, a marked area of a frame may be the range of the imaging region of the first X-ray source. It can be seen that the imaging region of the sixth X-ray source no longer overlaps with that of the first X-ray source. Thus, in the example of FIG. 4B, the number of X-ray sources involved within the range of the imaging region of the first X-ray source is 5.

It should be noted that FIG. 4A and FIG. 4b are only examples and do not affect the substance of the embodiments of the present disclosure.

Step 406 may include obtaining the respective corresponding target X-ray source of the plurality of X-ray sources according to the number of X-ray sources involved within the range of the imaging region corresponding to each of the plurality of X-ray sources.

In the present step, taking an example in FIG. 4a as an example, the imaging region of the first X-ray source does not overlap with that of the sixth X-ray source, then the sixth X-ray source may be the target X-ray source corresponding to the first X-ray source. In practice, for X-ray sources after the sixth X-ray source, such as the seventh X-ray source, the eighth X-ray source, and other X-ray sources after the eighth X-ray source, etc., these X-ray sources do not substantially overlap with the imaging region of the first X-ray source. Then the seventh X-ray source, the eighth X-ray source and other X-ray sources after the eighth X-ray source may be essentially the target X-ray source corresponding to the first X-ray source, which would be explained in the following two cases.

In a possible embodiment, alternatively, the current X-ray source is defined as the first X-ray source, and when the number of X-ray sources involved within the range of the imaging region corresponding to the first X-ray source is defined as n, the (n+1)-th X-ray source may be regarded as the target X-ray source corresponding to the first X-ray source. According to the number of X-ray sources involved within the range of the imaging region corresponding to each of the other X-ray sources, the other X-ray sources may be traversed to obtain the respective corresponding target X-ray source of the other X-ray sources.

Taking the example in FIG. 4a as an example again, the sixth X-ray source may be regarded as the target X-ray source corresponding to the first X-ray source, and the subsequent X-ray sources such as the seventh and eighth X-ray sources may be not regarded as the target X-ray source corresponding to the first X-ray source. For other X-ray sources such as the second and third X-ray sources, the respective corresponding target X-ray source may be obtained in accordance with the determination of the first X-ray source. In this way, each of the plurality of X-ray sources does not have two consecutive (adjacent) target X-ray sources along a direction, which enables subsequent grouping easier and improves an extraction speed of subsequent regions of interest.

In a possible embodiment, alternatively, the current X-ray source is defined as the first X-ray source, and when the number of X-ray sources involved within the range of the imaging region corresponding to the first X-ray source is defined as n, X-ray sources after an n-th X-ray source may be regarded as the target X-ray source corresponding to the first X-ray source. According to the number of X-ray sources involved within the range of the imaging region corresponding to each of the other X-ray sources, the other X-ray sources may be traversed to obtain the respective corresponding target X-ray source of the other X-ray sources.

Taking the example in FIG. 4a as an example again, the sixth X-ray source and X-ray sources after the sixth X-ray source may be regarded as target X-ray sources corresponding to the first X-ray source. For other X-ray sources, the respective corresponding target X-ray sources may be obtained in accordance with the determination of the first X-ray source. In the above determining the target X-ray sources corresponding to each of the plurality of X-ray sources, the target X-ray sources along the same direction corresponding to each of the plurality of X-ray sources may overlap with each other, so that more information about the region of interest may be obtained, thus improving accuracy of subsequent extraction of the region of interest.

In the region-of-interest extraction method of the present embodiment, the number of X-ray sources involved within the range of the imaging region corresponding to each of the plurality of X-ray sources may be calculated according to the distance between any adjacent two of the plurality of X-ray sources and the range of the imaging region corresponding to each of the plurality of X-ray sources, and the respective corresponding target X-ray source of the plurality of X-ray sources may be obtained according to the number of X-ray sources involved within the range of the imaging region corresponding to each of the plurality of X-ray sources. In the present embodiment, the target X-ray source corresponding to each of the plurality of X-ray sources may be determined by the range of the imaging region corresponding to each of the plurality of X-ray sources and the distance between any adjacent two of the plurality of X-ray sources, this process may be simple, and the target X-ray source may be determined more accurately, thus improving the accuracy of a grouping result obtained in the subsequent grouping based on the target X-ray source, and improving the accuracy of the extraction of the region of interest.

After determining the target X-ray source corresponding to each of the plurality of X-ray sources, each of the plurality of X-ray sources and the respective corresponding target X-ray source may combined to obtain the at least one X-ray source group. After that, the imaging regions of the X-ray sources in each X-ray source group may be combined, and a specific combination process is as follows.

In another embodiment, another region-of-interest extraction method is provided. The present embodiment relates to a specific process of combining the imaging regions of the X-ray sources in each X-ray source group. Based on the above embodiments, step 206 may include the following step A.

Step A may include combining the imaging regions of the X-ray sources either or both of horizontally and vertically in accordance with positions of the imaging regions of the X-ray sources in each of the at least one X-ray source group, and obtaining the combined imaging region corresponding to each of the at least one X-ray source group.

Figure 5:
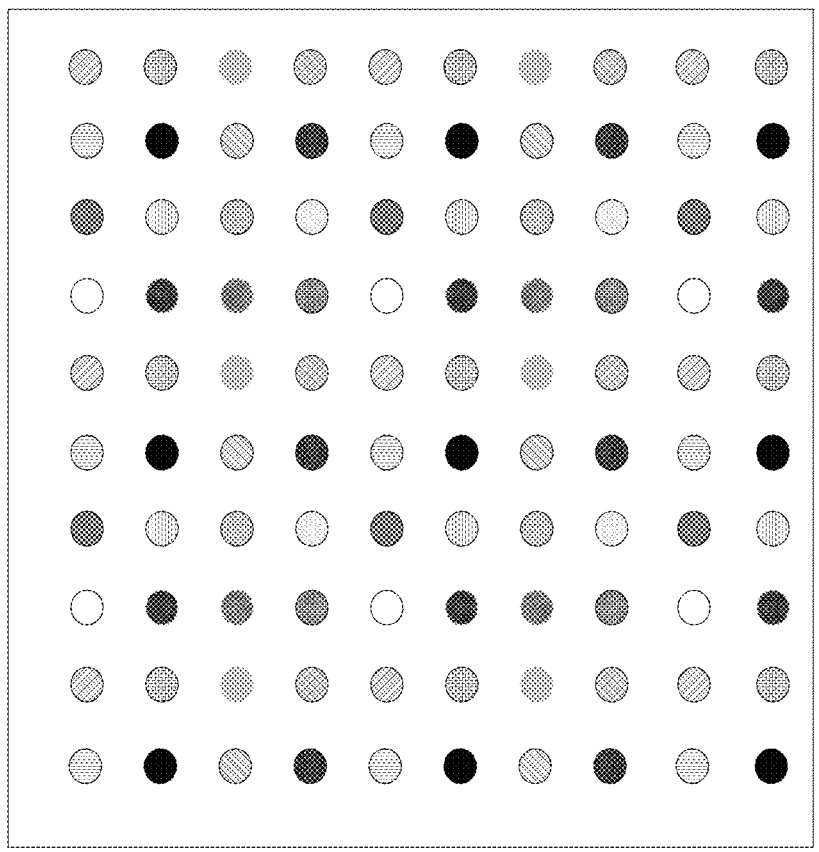
FIG. 5 is a schematic diagram of a target X-ray source corresponding to each X-ray source in another embodiment.

In the present step, referring to FIG. 5, taking a plurality of X-ray sources in the current X-ray source group as an example, the plurality of X-ray sources in the current X-ray source group may be distributed along a horizontal direction and a vertical direction. When the imaging regions of the X-ray sources in the current X-ray source group are combined, the imaging regions of the X-ray sources in the current X-ray source group may be combined either or both of horizontally and vertically in accordance with obtained position information of the imaging regions of the plurality of X-ray sources, and the combined imaging region corresponding to the current X-ray source group may be obtained. All the X-ray source groups may be traversed to obtain the combined imaging region corresponding to each of the X-ray source groups. The combination may be directly splicing the imaging regions of the plurality of X-ray sources in each of the X-ray source groups, or placing the imaging regions of the plurality of X-ray sources in order of sequence, up and down, or left and right, in accordance with the position information of the imaging regions of the plurality of X-ray sources.

Taking an X-ray source group composed of a plurality of X-ray sources which are distributed along a direction as an example, when the combination of the imaging regions is performed, the combined imaging region corresponding to the X-ray source group may be obtained by combining the imaging regions of the X-ray sources along the direction.

Taking an X-ray source group composed of an X-ray source as an example, the imaging region of the X-ray source does not need to be combined, and the imaging region of the X-ray source is the combined imaging region corresponding to the X-ray source group.

It should be noted that FIG. 5 is only an example and does not affect the substance of the embodiments of the present disclosure.

In the region-of-interest extraction method of the present embodiment, the imaging regions of the X-ray sources in each of the X-ray source groups may be combined either or both of horizontally and vertically in accordance with the positions of the imaging regions of the X-ray sources in each of the X-ray source groups, and the combined imaging region corresponding to each of the at least one X-ray source group may be obtained. The combination of the imaging regions is simple, and the combination result is accurate, thus improving the accuracy of the combined imaging region corresponding to each of the X-ray source groups.

It should be understood that although steps in the flowchart diagram in FIG. 2, FIG. 3, and FIG. 4 are shown in sequence as indicated by arrows, the steps do not necessarily follow the sequence indicated by the arrows. Unless explicitly stated in the article, an order of execution of these steps is not strictly limited, and these steps can be executed in other order. Moreover, at least some of the steps in FIG. 2. FIG. 3, and FIG. 4 may include multiple steps or stages, which are not necessarily completed at the same time, but can be executed at different times, and an execution sequence of these steps or stages is not necessarily sequential. Instead, these steps or stages can be performed alternately or interchangeably with other steps or at least parts of steps or stages within other steps.

Figure 6:
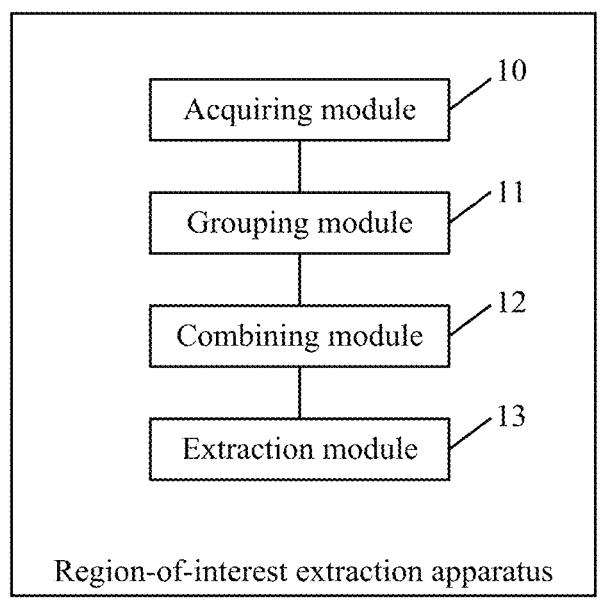
FIG. 6 is a block diagram of a structure of a region-of-interest extraction apparatus in an embodiment.

In an embodiment, referring to FIG. 6, a region-of-interest extraction apparatus applied to an X-ray imaging system is provided. The X-ray imaging system includes a detector and an array X-ray source, the array X-ray source includes a plurality of X-ray sources having different projection angles, and imaging regions corresponding to the plurality of X-ray sources are formed on the detector. The region-of-interest extraction apparatus includes an acquiring module 10, a grouping module 11, a combining module 12, and an extraction module 13.

The acquiring module 10 is configured for acquiring geometric position parameters corresponding to the plurality of X-ray sources.

The grouping module 11 is configured for grouping the plurality of X-ray sources according to the geometric position parameters of the plurality of X-ray sources, and determining at least one X-ray source group. Imaging regions of X-ray sources in the same X-ray source group do not overlap with each other.

The combining module 12 is configured for combining the imaging regions of the X-ray sources in each of the at least one X-ray source group, so as to determine a combined imaging region corresponding to each of the at least one X-ray source group.

The extraction module 13 is configured for performing region-of-interest extraction on projection data in the combined imaging region corresponding to each of the at least one X-ray source group.

The specific qualification of the region-of-interest extraction apparatus may be referred to the above qualification of the region-of-interest extraction method, which would not be repeated herein.

In another embodiment, another region-of-interest extraction apparatus is provided. Based on the above embodiments, the grouping module 11 may include a range calculation unit, a target determining unit, and a grouping unit.

The range calculation unit is configured for calculating ranges of the imaging regions corresponding to the plurality of X-ray sources according to the geometric position parameters corresponding to the plurality of X-ray sources.

The target determining unit is configured for determining a respective corresponding target X-ray source of the plurality of X-ray sources according to the ranges of the imaging regions corresponding to the plurality of X-ray sources, and the target X-ray source of the current X-ray source is an X-ray source whose imaging region does not overlap with the imaging region of the current X-ray source.

The grouping unit is configured for combining each of the plurality of X-ray sources and the respective corresponding target X-ray source to obtain the at least one X-ray source group.

Alternatively, the geometric position parameters corresponding to the plurality of X-ray sources may include first distances between adjacent X-ray sources, divergence angles corresponding to the plurality of X-ray sources, and second distances between the plurality of X-ray sources and the detector.

In another embodiment, another region-of-interest extraction apparatus is provided. Based on the above embodiments, the target determining unit may include an acquiring subunit, a calculating subunit, and a target determining subunit.

The acquiring subunit is configured for acquiring a distance between any adjacent two of the plurality of X-ray sources.

The calculating subunit is configured for calculating the number of X-ray sources involved within the range of the imaging region corresponding to each of the plurality of X-ray sources according to the distance between any adjacent two of the plurality of X-ray sources and the range of the imaging region corresponding to each of the plurality of X-ray sources.

The target determining subunit is configured for obtaining the respective corresponding target X-ray source of the plurality of X-ray sources according to the number of X-ray sources involved within the range of the imaging region corresponding to each of the plurality of X-ray sources.

Alternatively, the target determining subunit is specifically configured to regard an (n+1)-th X-ray source as the target X-ray source corresponding to the first X-ray source when the number of X-ray sources involved within the range of the imaging region corresponding to a first X-ray source is defined as n, and traverse the other X-ray sources according to the number of X-ray sources involved within the range of the imaging region corresponding to each of the other X-ray sources to obtain the respective corresponding target X-ray source of the other X-ray sources. The current X-ray source may be defined as the first X-ray source.

Alternatively, the target determining subunit is specifically configured to regard X-ray sources after an n-th X-ray source as the target X-ray source corresponding to the first X-ray source when the number of X-ray sources involved within the range of the imaging region corresponding to a first X-ray source is defined as n, and traverse the other X-ray sources according to the number of X-ray sources involved within the range of the imaging region corresponding to each of the other X-ray sources to obtain the respective corresponding target X-ray source of the other X-ray sources. The current X-ray source may be defined as the first X-ray source.

In another embodiment, another region-of-interest extraction apparatus is provided. Based on the above embodiments, the combining module 12 is specifically configured for combining the imaging regions of the X-ray sources either or both of horizontally and vertically in accordance with positions of the imaging regions of the X-ray sources in each of the at least one X-ray source group, and obtaining the combined imaging region corresponding to each of the at least one X-ray source group.

The specific qualification of the region-of-interest extraction apparatus may be referred to the above qualification of the region-of-interest extraction method, which would not be repeated herein.

Each module of the region-of-interest extraction apparatus may be implemented in whole or in part by software, hardware and a combination thereof. The above modules may be embedded in a hardware form or independent of a processor in a computer device, and may also be stored in a software form in a memory of the computer device, so that the processor may call and perform corresponding operations of the above modules.

In an embodiment, a computer device is provided, which may be a terminal or a server. Taking the terminal as an example, an internal structure diagram of the terminal may be shown in FIG. 7. The computer device may include a processor, a memory, a communication interface, a display screen and an input device connected via a system bus. The processor of the computer device is configured to provide computing and control capabilities. The memory of the computer device may include a non-volatile storage medium and an internal memory. The non-volatile storage medium may store an operating system and a computer program. The internal memory may provide an environment for operation of the operating system and the computer program in the non-volatile storage media. The communication interface of the computer device is configured for wired or wireless communication with external terminals, and the wireless manner may be implemented via WIFI, carrier networks, NFC (Near Field communication), or other technologies. The computer program may implement the region-of-interest extraction method when the computer program is executed by the processor. The display screen of the computer device may be a liquid crystal display screen or an electronic ink display screen, and the input device of the computer device may be a touch layer covered on the display screen, or a key, trackball or trackpad set on a shell of the computer device, or an external keyboard, trackpad, or mouse.

Figure 7:
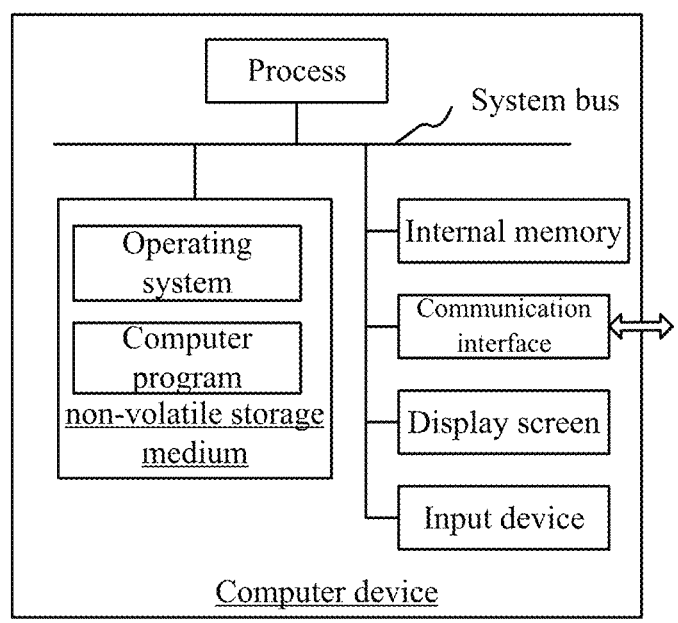
FIG. 7 is an internal structure diagram of a computer device in an embodiment.

One skilled in the art may understand that the structure shown in FIG. 7 is only a block diagram of a part of the structure related to the present disclosure and does not constitute a limitation of the computer device to which the present disclosure is applied. A specific computer device may include more or less components than that shown in the figure, a combination of some components, or a different component arrangement.

In an embodiment, a computer device is provided. The computer device includes a processor and a memory, the memory stores a computer program, the computer program is executable by the processor to implement the following steps:

acquiring geometric position parameters corresponding to the plurality of X-ray sources;

grouping the plurality of X-ray sources according to the geometric position parameters of the plurality of X-ray sources, determining at least one X-ray source group, and imaging regions of X-ray sources in the same X-ray source group not overlapping with each other;

combining the imaging regions of the X-ray sources in each of the at least one X-ray source group, so as to determine a combined imaging region corresponding to each of the at least one X-ray source group; and performing region-of-interest extraction on projection data in the combined imaging region corresponding to each of the at least one X-ray source group.

In an embodiment, the computer program is executable by the processor to further implement the following steps:

calculating ranges of the imaging regions corresponding to the plurality of X-ray sources according to the geometric position parameters corresponding to the plurality of X-ray sources;

determining a respective corresponding target X-ray source of the plurality of X-ray sources according to the ranges of the imaging regions corresponding to the plurality of X-ray sources, and the target X-ray source of the current X-ray source being an X-ray source whose imaging region does not overlap with the imaging region of the current X-ray source; and combining each of the plurality of X-ray sources and the respective corresponding target X-ray source to obtain the at least one X-ray source group.

In an embodiment, the computer program is executable by the processor to further implement the following steps:

acquiring a distance between any adjacent two of the plurality of X-ray sources;

calculating the number of X-ray sources involved within the range of the imaging region corresponding to each of the plurality of X-ray sources according to the distance between any adjacent two of the plurality of X-ray sources and the range of the imaging region corresponding to each of the plurality of X-ray sources; and obtaining the respective corresponding target X-ray source of the plurality of X-ray sources according to the number of X-ray sources involved within the range of the imaging region corresponding to each of the plurality of X-ray sources.

In an embodiment, the computer program is executable by the processor to further implement the following steps:

when the number of X-ray sources involved within the range of the imaging region corresponding to a first X-ray source is defined as n, an (n+1)-th X-ray source being regarded as the target X-ray source corresponding to the first X-ray source, and the current X-ray source being defined as the first X-ray source; and traversing the other X-ray sources according to the number of X-ray sources involved within the range of the imaging region corresponding to each of the other X-ray sources to obtain the respective corresponding target X-ray source of the other X-ray sources.

In an embodiment, the computer program is executable by the processor to further implement the following steps:

when the number of X-ray sources involved within the range of the imaging region corresponding to a first X-ray source is defined as n, X-ray sources after an n-th X-ray source being regarded as the target X-ray source corresponding to the first X-ray source, and the current X-ray source being defined as the first X-ray source; and traversing the other X-ray sources according to the number of X-ray sources involved within the range of the imaging region corresponding to each of the other X-ray sources to obtain the respective corresponding target X-ray source of the other X-ray sources.

In an embodiment, the geometric position parameters corresponding to the plurality of X-ray sources may include first distances between adjacent X-ray sources, divergence angles corresponding to the plurality of X-ray sources, and second distances between the plurality of X-ray sources and the detector.

In an embodiment, the computer program is executable by the processor to further implement the following steps:

combining the imaging regions of the X-ray sources either or both of horizontally and vertically in accordance with positions of the imaging regions of the X-ray sources in each of the at least one X-ray source group, and obtaining the combined imaging region corresponding to each of the at least one X-ray source group.

In an embodiment, a computer-readable storage is provided. The computer-readable storage medium has stored a computer program, and the computer program is executable by the processor to implement the following steps:

acquiring geometric position parameters corresponding to the plurality of X-ray sources;

grouping the plurality of X-ray sources according to the geometric position parameters of the plurality of X-ray sources, determining at least one X-ray source group, and imaging regions of X-ray sources in the same X-ray source group not overlapping with each other;

combining the imaging regions of the X-ray sources in each of the at least one X-ray source group, so as to determine a combined imaging region corresponding to each of the at least one X-ray source group; and performing region-of-interest extraction on projection data in the combined imaging region corresponding to each of the at least one X-ray source group.

In an embodiment, the computer program is executable by the processor to further implement the following steps:

calculating ranges of the imaging regions corresponding to the plurality of X-ray sources according to the geometric position parameters corresponding to the plurality of X-ray sources;

determining a respective corresponding target X-ray source of the plurality of X-ray sources according to the ranges of the imaging regions corresponding to the plurality of X-ray sources, and the target X-ray source of the current X-ray source being an X-ray source whose imaging region does not overlap with the imaging region of the current X-ray source; and combining each of the plurality of X-ray sources and the respective corresponding target X-ray source to obtain the at least one X-ray source group.

In an embodiment, the computer program is executable by the processor to further implement the following steps:

acquiring a distance between any adjacent two of the plurality of X-ray sources;

calculating the number of X-ray sources involved within the range of the imaging region corresponding to each of the plurality of X-ray sources according to the distance between any adjacent two of the plurality of X-ray sources and the range of the imaging region corresponding to each of the plurality of X-ray sources; and obtaining the respective corresponding target X-ray source of the plurality of X-ray sources according to the number of X-ray sources involved within the range of the imaging region corresponding to each of the plurality of X-ray sources.

In an embodiment, the computer program is executable by the processor to further implement the following steps:

when the number of X-ray sources involved within the range of the imaging region corresponding to a first X-ray source is defined as n, an (n+1)-th X-ray source being regarded as the target X-ray source corresponding to the first X-ray source, and the current X-ray source being defined as the first X-ray source; and traversing the other X-ray sources according to the number of X-ray sources involved within the range of the imaging region corresponding to each of the other X-ray sources to obtain the respective corresponding target X-ray source of the other X-ray sources.

In an embodiment, the computer program is executable by the processor to further implement the following steps:

when the number of X-ray sources involved within the range of the imaging region corresponding to a first X-ray source is defined as n. X-ray sources after an n-th X-ray source being regarded as the target X-ray source corresponding to the first X-ray source, and the current X-ray source being defined as the first X-ray source; and traversing the other X-ray sources according to the number of X-ray sources involved within the range of the imaging region corresponding to each of the other X-ray sources to obtain the respective corresponding target X-ray source of the other X-ray sources.

In an embodiment, the geometric position parameters corresponding to the plurality of X-ray sources may include first distances between adjacent X-ray sources, divergence angles corresponding to the plurality of X-ray sources, and second distances between the plurality of X-ray sources and the detector.

In an embodiment, the computer program is executable by the processor to further implement the following steps:

combining the imaging regions of the X-ray sources either or both of horizontally and vertically in accordance with positions of the imaging regions of the X-ray sources in each of the at least one X-ray source group, and obtaining the combined imaging region corresponding to each of the at least one X-ray source group.

One skilled in the art may understand that all or part of the process of implementing the method in the above embodiments may be accomplished by instructing the relevant hardware by a computer program, the computer program may be stored in a non-volatile computer readable storage medium, and the computer program may include a process such as that of the method in the above embodiments when executed. Any reference to a memory, a storage, a database or other medium used in the embodiments provided in the present disclosure may include at least one of a non-volatile memory and a volatile memory. The non-volatile memory may include a Read-Only memory (ROM), a magnetic tape, a floppy disk, a flash memory, or an optical memory. The volatile memory may include a Random Access Memory (RAM) or an external cache memory. As an illustration rather than a limitation, the RAM may come in many forms, such as a Static Random Access Memory (SRAM), a Dynamic Random Access Memory (DRAM), and the like.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

What is claimed is:

1. A region-of-interest extraction method, applied to an X-ray imaging system, wherein the X-ray imaging system comprises a detector and an array X-ray source, the array X-ray source comprises a plurality of X-ray sources having different projection angles, and imaging regions corresponding to the plurality of X-ray sources are formed on the detector;

the region-of-interest extraction method comprises:
acquiring geometric position parameters corresponding to the plurality of X-ray sources;
grouping the plurality of X-ray sources according to the geometric position parameters of the plurality of X-ray sources, and determining at least one X-ray source group, wherein imaging regions of X-ray sources in the same X-ray source group do not overlap with each other;
combining the imaging regions of the X-ray sources in each of the at least one X-ray source group, so as to determine a combined imaging region corresponding to each of the at least one X-ray source group; and
performing region-of-interest extraction on projection data in the combined imaging region corresponding to each of the at least one X-ray source group.

2. The method of claim 1, wherein the grouping the plurality of X-ray sources according to the geometric position parameters of the plurality of X-ray sources, and determining at least one X-ray source group further comprises:
calculating ranges of the imaging regions corresponding to the plurality of X-ray sources according to the geometric position parameters corresponding to the plurality of X-ray sources;
determining a respective corresponding target X-ray source of the plurality of X-ray sources according to the ranges of the imaging regions corresponding to the plurality of X-ray sources, wherein the target X-ray source of the current X-ray source is an X-ray source whose imaging region does not overlap with the imaging region of the current X-ray source; and
combining each of the plurality of X-ray sources and the respective corresponding target X-ray source to obtain the at least one X-ray source group.

3. The method of claim 2, wherein the determining the respective corresponding target X-ray source of the plurality of X-ray sources according to the ranges of the imaging regions corresponding to the plurality of X-ray sources further comprises:
acquiring a distance between any adjacent two of the plurality of X-ray sources;
calculating the number of X-ray sources involved within the range of the imaging region corresponding to each of the plurality of X-ray sources according to the distance between any adjacent two of the plurality of X-ray sources and the range of the imaging region corresponding to each of the plurality of X-ray sources; and
obtaining the respective corresponding target X-ray source of the plurality of X-ray sources according to the number of X-ray sources involved within the range of the imaging region corresponding to each of the plurality of X-ray sources.

4. The method of claim 3, wherein the obtaining the respective corresponding target X-ray source of the plurality of X-ray sources according to the number of X-ray sources involved within the range of the imaging region corresponding to each of the plurality of X-ray sources further comprises:
when the number of X-ray sources involved within the range of the imaging region corresponding to a first X-ray source is defined as n, an (n+1)-th X-ray source being regarded as the target X-ray source corresponding to the first X-ray source, wherein the current X-ray source is defined as the first X-ray source; and
traversing the other X-ray sources according to the number of X-ray sources involved within the range of the imaging region corresponding to each of the other X-ray sources to obtain the respective corresponding target X-ray source of the other X-ray sources.

5. The method of claim 3, wherein the obtaining the respective corresponding target X-ray source of the plurality of X-ray sources according to the number of X-ray sources involved within the range of the imaging region corresponding to each of the plurality of X-ray sources further comprises:
when the number of X-ray sources involved within the range of the imaging region corresponding to a first X-ray source is defined as n, X-ray sources after an n-th X-ray source being regarded as the target X-ray source corresponding to the first X-ray source, wherein the current X-ray source is defined as the first X-ray source; and traversing the other X-ray sources according to the number of X-ray sources involved within the range of the imaging region corresponding to each of the other X-ray sources to obtain the respective corresponding target X-ray source of the other X-ray sources.

6. The method of claim 1, wherein the combining the imaging regions of the X-ray sources in each of the at least one X-ray source group, so as to determine the combined imaging region corresponding to each of the at least one X-ray source group further comprises:

combining the imaging regions of the X-ray sources either or both of horizontally and vertically in accordance with positions of the imaging regions of the X-ray sources in each of the at least one X-ray source group, and obtaining the combined imaging region corresponding to each of the at least one X-ray source group.

7. The method of claim 3, wherein the geometric position parameters comprise relative positional relationship parameters between adjacent X-ray sources, relative positional relationship parameters between the plurality of X-ray sources and the detector, and angle parameters of the plurality of X-ray sources.

8. The method of claim 7, wherein the relative positional relationship parameters between adjacent X-ray sources further comprises first distances between adjacent X-ray sources;

the relative positional relationship parameters between the plurality of X-ray sources and the detector further comprises second distances between the plurality of X-ray sources and the detector; and the angle parameters of the plurality of X-ray sources further comprises divergence angles corresponding to the plurality of X-ray sources.

9. The method of claim 8, wherein all the first distances between adjacent X-ray sources are equal;

all the second distances between the plurality of X-ray sources and the detector are equal; and all the divergence angles corresponding to the plurality of X-ray sources are equal.

10. The method of claim 9, wherein the calculating the ranges of the imaging regions corresponding to the plurality of X-ray sources according to geometric position parameters corresponding to the plurality of X-ray sources further comprises:

$$R = 2 \times SID \times \tan(p/2),$$

wherein R represents the range of the imaging region of each X-ray source, SID represents the second distance of corresponding X-ray source, and p represents the divergence angle of corresponding X-ray source.

11. The method of claim 10, wherein the calculating the number of X-ray sources involved within the range of the imaging region corresponding to each of the plurality of X-ray sources according to the distance between any adjacent two of the plurality of X-ray sources and the range of the imaging region corresponding to each of the plurality of X-ray sources further comprises:

$$n = \Pi(R/d),$$

wherein n represents the number of X-ray sources involved within the range of the imaging region corresponding to each of the plurality of X-ray sources, d represents the first distance of corresponding X-ray source, and $\Pi(R/d)$ represents a contrast value R/d rounded upward.

12. A region-of-interest extraction apparatus, applied to an X-ray imaging system, wherein the X-ray imaging system comprises a detector and an array X-ray source, the array X-ray source comprises a plurality of X-ray sources having different projection angles, and imaging regions corresponding to the plurality of X-ray sources are formed on the detector;

the region-of-interest extraction apparatus comprises an acquiring module (10), a grouping module (11), a combining module (12), and an extraction module (13);

the acquiring module (10) is configured for acquiring geometric position parameters corresponding to the plurality of X-ray sources;

the grouping module (11) is configured for grouping the plurality of X-ray sources according to the geometric position parameters of the plurality of X-ray sources, and determining at least one X-ray source group, wherein imaging regions of X-ray sources in the same X-ray source group do not overlap with each other;

the combining module (12) is configured for combining the imaging regions of the X-ray sources in each of the at least one X-ray source group, so as to determine a combined imaging region corresponding to each of the at least one X-ray source group; and the extraction module (13) is configured for performing region-of-interest extraction on projection data in the combined imaging region corresponding to each of the at least one X-ray source group.

13. A computer device, comprising a processor and a memory, the memory storing a computer program, wherein the computer program is executable by the processor to implement the steps of the region-of-interest extraction method of claim 1.

14. An X-ray imaging system, comprising a detector, an array X-ray source, and the computer device of claim 13.

15. A computer-readable storage medium having stored a computer program, wherein the computer program is executable by a processor to implement the steps of the region-of-interest extraction method of claim 1.

16. The computer device of claim 13, wherein the grouping the plurality of X-ray sources according to the geometric position parameters of the plurality of X-ray sources, and determining at least one X-ray source group further comprises:

calculating ranges of the imaging regions corresponding to the plurality of X-ray sources according to the geometric position parameters corresponding to the plurality of X-ray sources;

determining a respective corresponding target X-ray source of the plurality of X-ray sources according to the ranges of the imaging regions corresponding to the plurality of X-ray sources, wherein the target X-ray source of the current X-ray source is an X-ray source whose imaging region does not overlap with the imaging region of the current X-ray source; and combining each of the plurality of X-ray sources and the respective corresponding target X-ray source to obtain the at least one X-ray source group.

17. The computer device of claim 16, wherein the determining the respective corresponding target X-ray source of the plurality of X-ray sources according to the ranges of the imaging regions corresponding to the plurality of X-ray sources further comprises:

acquiring a distance between any adjacent two of the plurality of X-ray sources;

calculating the number of X-ray sources involved within the range of the imaging region corresponding to each of the plurality of X-ray sources according to the distance between any adjacent two of the plurality of X-ray sources and the range of the imaging region corresponding to each of the plurality of X-ray sources; and obtaining the respective corresponding target X-ray source of the plurality of X-ray sources according to the number of X-ray sources involved within the range of the imaging region corresponding to each of the plurality of X-ray sources.

18. The computer device of claim 17, wherein the obtaining the respective corresponding target X-ray source of the plurality of X-ray sources according to the number of X-ray sources involved within the range of the imaging region corresponding to each of the plurality of X-ray sources further comprises:

when the number of X-ray sources involved within the range of the imaging region corresponding to a first X-ray source is defined as n, an (n+1)-th X-ray source being regarded as the target X-ray source corresponding to the first X-ray source, wherein the current X-ray source is defined as the first X-ray source; and traversing the other X-ray sources according to the number of X-ray sources involved within the range of the imaging region corresponding to each of the other X-ray sources to obtain the respective corresponding target X-ray source of the other X-ray sources.

\* \* \* \* \*